United States Patent
Ujiie et al.

(10) Patent No.: US 10,743,156 B2
(45) Date of Patent: Aug. 11, 2020

(54) IN-VEHICLE DEVICE, MOBILE TERMINAL DEVICE, RECOGNITION SUPPORT SYSTEM, RECOGNITION SUPPORT METHOD, AND RECOGNITION SUPPORT PROGRAM

(71) Applicant: Mitsubishi Electric Corporation, Tokyo (JP)

(72) Inventors: Junya Ujiie, Tokyo (JP); Shinji Maeda, Tokyo (JP); Yuka Takahashi, Tokyo (JP); Hironobu Abe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/341,728

(22) PCT Filed: Nov. 17, 2016

(86) PCT No.: PCT/JP2016/084063
§ 371 (c)(1),
(2) Date: Apr. 12, 2019

(87) PCT Pub. No.: WO2018/092231
PCT Pub. Date: May 24, 2018

(65) Prior Publication Data
US 2020/0053526 A1 Feb. 13, 2020

(51) Int. Cl.
*H04W 24/00* (2009.01)
*H04W 4/40* (2018.01)
(Continued)

(52) U.S. Cl.
CPC .............. *H04W 4/40* (2018.02); *G08G 1/162* (2013.01); *H04W 4/029* (2018.02)

(58) Field of Classification Search
CPC ......... H04W 4/40; H04W 4/029; H04W 4/02; G08G 1/162; G08G 1/0104; G08G 1/0145; B60T 7/12
(Continued)

(56) References Cited

U.S. PATENT DOCUMENTS 6,885,968 B2 * 4/2005 Breed .................... B60Q 9/008
702/142
7,049,945 B2 * 5/2006 Breed .................... B60Q 9/008
340/435
(Continued)

FOREIGN PATENT DOCUMENTS

EP  2 101 305 A2  9/2009
JP  2005-327177 A  11/2005
(Continued)

*Primary Examiner* — Sonny Trinh
(74) *Attorney, Agent, or Firm* — Birch, Stewart, Kolasch & Birch, LLP

(57) ABSTRACT

An in-vehicle device performing communication with a mobile terminal device includes a vehicle exterior communication unit, an in-vehicle detection unit that detects a vehicle present location, a vehicle interior communication unit that acquires detection information on an object from a detection unit, and an in-vehicle control unit that generates recognition information including position information on the object based on vehicle position information indicating the vehicle present location and the detection information on the object and makes the vehicle exterior communication unit deliver the recognition information. The vehicle exterior communication unit receives existence notification information transmitted from the mobile terminal device when the mobile terminal device receiving the recognition information judges that the in-vehicle device has not recognized existence of a first object equipped with the mobile terminal device.

16 Claims, 8 Drawing Sheets

(51) Int. Cl.
*H04W 4/029* (2018.01)
*G08G 1/16* (2006.01)

(58) Field of Classification Search
USPC .................................. 455/414.2, 457, 566
See application file for complete search history.

(56) References Cited

U.S. PATENT DOCUMENTS

| | | | |
|---|---|---|---|
| 9,586,563 B2* | 3/2017 | Kanai | B60T 7/08 |
| 10,042,363 B1* | 8/2018 | Hayward | G05D 1/0285 |
| 10,382,579 B2* | 8/2019 | Mevissen | H04W 4/02 |
| 2014/0191884 A1 | 7/2014 | Maeda et al. | |
| 2018/0308275 A1* | 10/2018 | Fortmann | G06K 9/00791 |
| 2019/0258251 A1* | 8/2019 | Ditty | G05D 1/0088 |

FOREIGN PATENT DOCUMENTS

| | | |
|---|---|---|
| JP | 2006-178673 A | 7/2006 |
| JP | 2008-217120 A | 9/2008 |
| JP | 2008-257582 A | 10/2008 |
| JP | 2009-123249 A | 6/2009 |
| JP | 2009-134363 A | 6/2009 |
| JP | 2009-134759 A | 6/2009 |
| JP | 2009-217438 A | 9/2009 |
| WO | WO 2013/080249 A1 | 6/2013 |

* cited by examiner

IN-VEHICLE DEVICE, MOBILE TERMINAL DEVICE, RECOGNITION SUPPORT SYSTEM, RECOGNITION SUPPORT METHOD, AND RECOGNITION SUPPORT PROGRAM

TECHNICAL FIELD

The present invention relates to an in-vehicle device that delivers recognition information including detection information on an object existing in the vicinity of a vehicle to a mobile terminal device provided on the object, the mobile terminal device that receives the recognition information delivered from the in-vehicle device, a recognition support system for supporting a user of the mobile terminal device by using the recognition information delivered from the in-vehicle device, a recognition support method executed in the recognition support system, and a recognition support program.

BACKGROUND ART

There have been proposed various types of wireless communication systems for preventing traffic accidents by notifying a pedestrian or a driver of another vehicle of the existence of a host vehicle (i.e., calling attention) through direct wireless communication (i.e., wireless communication not via a telephone network) between an in-vehicle device installed in the vehicle (host vehicle) and a mobile terminal device provided on the object (e.g., a pedestrian or a another vehicle) (see Patent References 1 and 2, for example).

The Patent Reference 1 describes a wireless communication system in which an in-vehicle wireless communication device (in-vehicle device) installed in a vehicle and a pedestrian mobile wireless communication device (mobile terminal device) carried by a pedestrian perform direct wireless communication. In this system, the in-vehicle device transmits a pedestrian transmission signal including identification information (ID) on the mobile terminal device to the mobile terminal device. The mobile terminal device judges whether or not identification information on the mobile terminal device itself is included in the received pedestrian transmission signal, and calls attention of the pedestrian if the identification information on the mobile terminal device itself is not included in the received pedestrian transmission signal.

The Patent Reference 2 describes a traffic information communication system in which an in-vehicle communication device (in-vehicle device) installed in a vehicle and a cellular phone device (mobile terminal device) carried by a pedestrian perform wireless communication. In this system, the in-vehicle device identifies a mobile terminal device as the target of the attention by using an identifier (ID) acquired from the mobile terminal device and transmits information including the ID of the mobile terminal device. The mobile terminal device receiving the information outputs an attention display on an output unit of the mobile terminal device if the ID included in the received information coincides with the ID of the mobile terminal device (host terminal).

PRIOR ART REFERENCE

Patent Reference

Patent Reference 1: Japanese Patent Application Publication No. 2009-123249 (claim 3 and paragraphs 0058 and 0063, for example)

Patent Reference 2: Japanese Patent Application Publication No. 2009-217438 (claims 1 to 14 and paragraph 0053, for example)

SUMMARY OF THE INVENTION

Problem to be Solved by the Invention

However, the in-vehicle devices described in the Patent References 1 and 2 have problems in that the information for notifying the mobile terminal device of the existence of the vehicle cannot be transmitted in a period before the ID of the mobile terminal device provided on the object (e.g., a pedestrian or another vehicle) is acquired, and the user of the mobile terminal device (e.g., a pedestrian or a driver of another vehicle) cannot learn the existence of the vehicle at an early stage.

Further, suppose the in-vehicle device transmits an attention calling signal with no ID, the user of the mobile terminal device receiving the signal cannot learn whether or not the in-vehicle device has correctly recognized the existence of the user as the object. Accordingly, there is a problem in that the user of the mobile terminal device feels unease about the passing vehicle even when the passing vehicle has correctly recognized the existence of the user.

The object of the present invention, which has been made to resolve the above-described problems with the conventional technology, is to provide an in-vehicle device, a mobile terminal device, a recognition support system, a recognition support method and a recognition support program that make it possible to deliver correct recognition information on an object existing in the vicinity of a vehicle to a mobile terminal device quickly and reliably and to prevent the user of the mobile terminal device from feeling unease.

Means for Solving the Problem

An in-vehicle device according to an aspect of the present invention is an in-vehicle device that is installed in a vehicle including a detection unit for detecting an object and performs communication with a mobile terminal device, comprising: a vehicle exterior communication unit to perform wireless communication; an in-vehicle detection unit to detect a vehicle present location of the vehicle; a vehicle interior communication unit to acquire detection information on the object from the detection unit; and an in-vehicle control unit to generate recognition information including position information on the object based on vehicle position information indicating the vehicle present location and the detection information on the object and make the vehicle exterior communication unit deliver the recognition information. The vehicle exterior communication unit receives existence notification information transmitted from the mobile terminal device when the mobile terminal device receiving the recognition information judges that the in-vehicle device does not recognize existence of a first object equipped with the mobile terminal device.

A mobile terminal device according to another aspect of the present invention is a mobile terminal device that performs communication with an in-vehicle device installed in a vehicle including a detection unit for detecting an object, the mobile terminal device comprising: a terminal communication unit to receive recognition information when the in-vehicle device detects a vehicle present location of the vehicle, acquire detection information on an object existing in a vicinity of the vehicle, generate the recognition information including position information on the object based on the vehicle present location and the detection information on the object, and deliver the recognition information; a terminal present location detection unit to detect a terminal present location of the mobile terminal device; and a terminal control unit to judge whether the in-vehicle device recognizes existence of a first object equipped with the mobile terminal device or not based on the terminal present location and the recognition information received by the terminal communication unit, and make the terminal communication unit transmit existence notification information to the in-vehicle device when the terminal control unit judges that the in-vehicle device does not recognize the existence of the first object.

A recognition support system according to another aspect of the present invention is a recognition support system comprising an in-vehicle device installed in a vehicle including a detection unit for detecting an object and a mobile terminal device to perform communication with the in-vehicle device. The in-vehicle device includes: a vehicle exterior communication unit to perform wireless communication; an in-vehicle detection unit to detect a vehicle present location of the vehicle; a vehicle interior communication unit to acquire detection information on the object from the detection unit; and an in-vehicle control unit to generate recognition information including position information on the object based on vehicle position information indicating the vehicle present location and the detection information on the object and make the vehicle exterior communication unit deliver the recognition information. The mobile terminal device includes: a terminal communication unit to perform wireless communication; a terminal present location detection unit to detect a terminal present location of the mobile terminal device; and a terminal control unit to judge whether the in-vehicle device recognizes existence of a first object equipped with the mobile terminal device or not based on the terminal present location and the recognition information received by the terminal communication unit and make the terminal communication unit transmit existence notification information to the in-vehicle device when the terminal control unit judges that the in-vehicle device does not recognize the existence of the first object.

Effect of the Invention

According to the present invention, correct recognition information on the object existing in the vicinity of the vehicle can be delivered to the mobile terminal device provided on the object quickly and reliably.

Further, according to the present invention, since the in-vehicle device is capable of updating the recognition information by using the existence notification information transmitted from the mobile terminal device based on judgment made by using the position information and transmits the update notification information indicating that the recognition information has been updated to the mobile terminal device, the unease felt by the user of the mobile terminal device can be eliminated.

MODE FOR CARRYING OUT THE INVENTION

In-vehicle devices, mobile terminal devices, recognition support systems, recognition support methods and recognition support programs according to embodiments of the present invention will be described below with reference to the accompanying drawings. In the following description, a vehicle is an automobile traveling on a road, and an object is a pedestrian existing in the vicinity of the vehicle (host vehicle) and carrying a mobile terminal device. The vehicle is, for example, an automobile and may also be an automobile having an automated driving function or a driving support function. The vehicle may also be a moving object other than an automobile (e.g., a different type of device having a traveling function, such as a motorcycle or a bicycle). Further, the object may also be a vehicle other than the host vehicle (another vehicle) existing in the vicinity of the host vehicle and equipped with a mobile terminal device. Furthermore, the object may also be an obstacle other than a pedestrian or another vehicle.

(1) First Embodiment (1-1) Configuration

Figure 1:
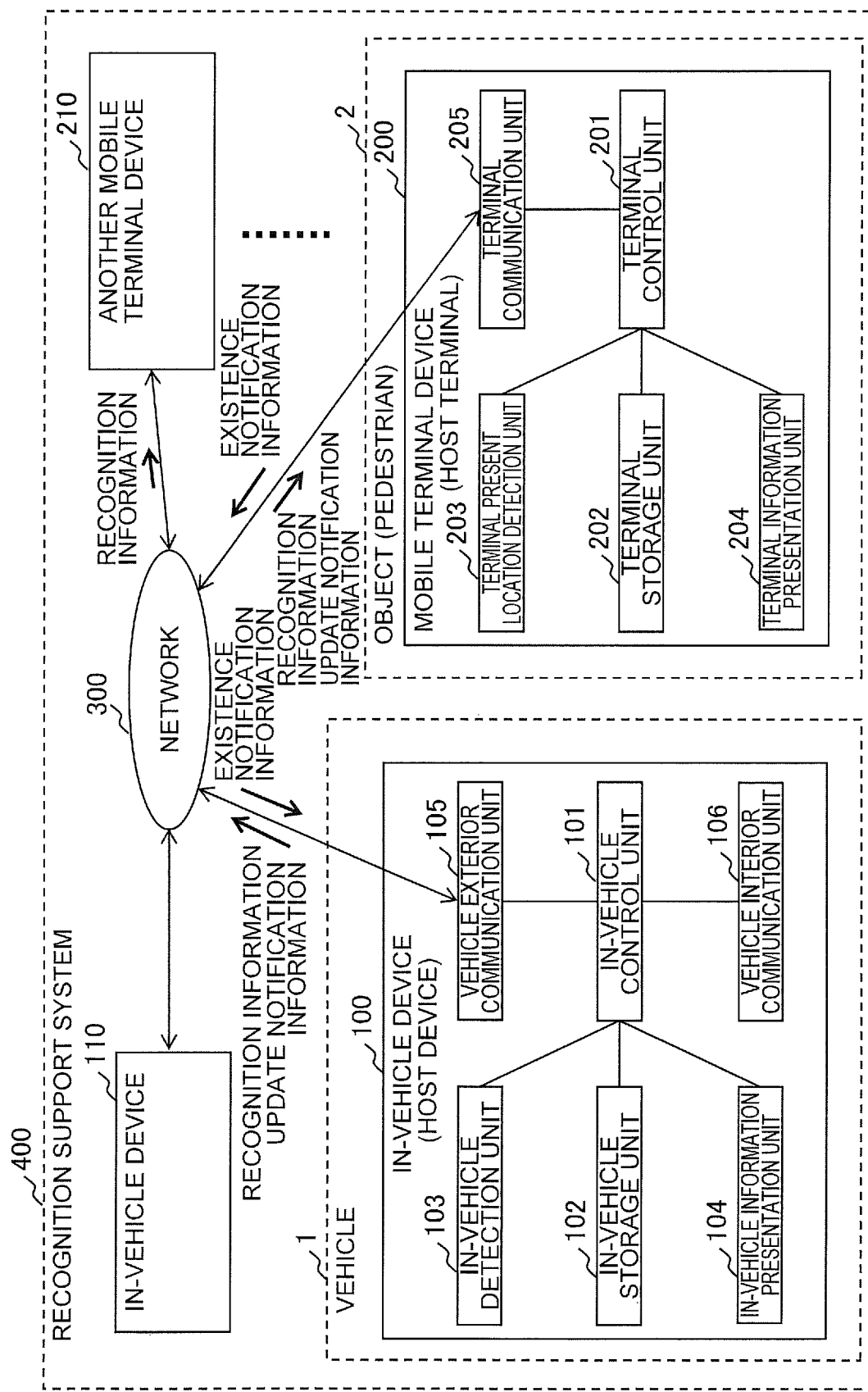
FIG. 1 is a functional block diagram schematically showing an example of the configuration of a recognition support system in a first embodiment of the present invention.

FIG. 1 is a functional block diagram schematically showing an example of the configuration of a recognition support system 400 in a first embodiment of the present invention. The recognition support system 400 is a system capable of executing a recognition support method and a recognition support program in the first embodiment. As shown in FIG. 1, the recognition support system 400 is a system including an in-vehicle device (in-vehicle communication device) 100 installed in a vehicle (host vehicle) 1 and a mobile terminal device 200 existing outside the vehicle 1.

The recognition support system 400 can include one or more in-vehicle devices 100, 110 and one or more mobile terminal devices 200, 210. In the first embodiment, the description will be given of a case where the in-vehicle devices 100 and 110 have the same configuration as each other and the mobile terminal devices 200 and 210 have the same configuration as each other. The recognition support system 400 may be a pedestrian recognition support system that supports a pedestrian carrying the mobile terminal device 200 so that the pedestrian can walk safely and at ease. The mobile terminal device 200 is, for example, a cellular phone, a smartphone, a tablet terminal, a personal computer or the like carried by the pedestrian as the object. The mobile terminal device 200 may also be a communication device installed in another vehicle. The mobile terminal device 200 is a communication device capable of performing communication with the in-vehicle device 100 directly, via a network 300 (not via a telephone network), or via a repeater or the like provided on a road. The network 300 is a wireless network, for example.

Figure 2:
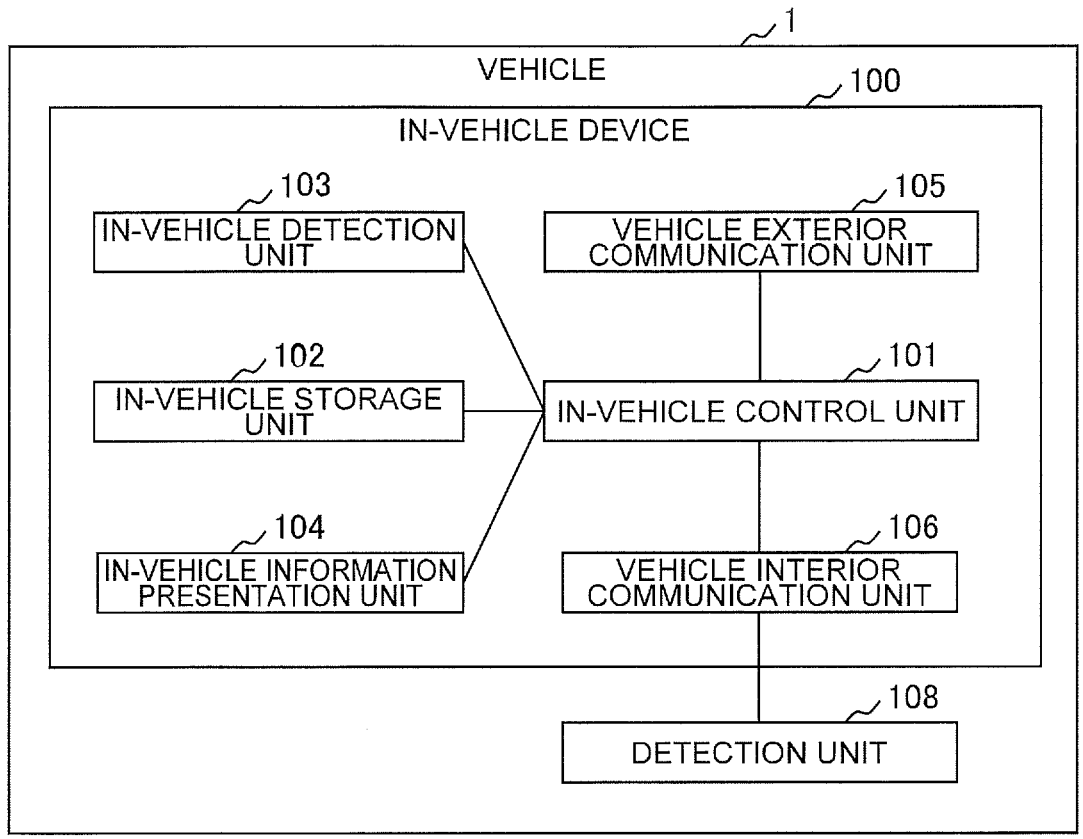
FIG. 2 is a functional block diagram schematically showing an example of the configuration of an in-vehicle device in the first embodiment.

FIG. 2 is a functional block diagram schematically showing an example of the configuration of the in-vehicle device 100 in the first embodiment. As shown in FIG. 2, the in-vehicle device 100 includes a vehicle exterior communication unit 105 capable of performing wireless communication via the network 300 and an in-vehicle detection unit 103 capable of detecting status of the vehicle such as a vehicle present location (vehicle position) as the position where the vehicle 1 exists. The in-vehicle device 100 further includes a vehicle interior communication unit 106 that acquires detection information from a detection unit 108 detecting the object existing in the vicinity of the vehicle 1 and an in-vehicle control unit 101 that generates recognition information (recognition information 5 shown in FIG. 6 which will be explained later) including position information on the object based on the vehicle present location and the detection information on the object and makes the vehicle exterior communication unit 105 deliver the recognition information via the network 300. While a case where the detection unit 108 detecting the object is a component outside the in-vehicle device 100 will be described in the first embodiment, the detection unit 108 may also be a part of the in-vehicle device 100. Further, as shown in FIG. 2, the in-vehicle device 100 may include an in-vehicle storage unit 102 that stores information and an in-vehicle information presentation unit 104 that displays an image or outputs sound.

In the first embodiment, the vehicle interior communication unit 106 exchanges data with the detection unit 108 as another device connected to a vehicle interior network. The detection unit 108 is, for example, a device that measures status of a device for observing the outside of the vehicle such as a camera and a radar and a device such as a steering wheel, an accelerator and a brake. The detection unit 108 is installed in the vehicle 1, detects (measures) the object in the vicinity of the vehicle 1, and supplies the detection information obtained as the result of the detection (e.g., the number of objects, a distance to the object, a direction in which the object exists, a position of the object, and so forth) to the in-vehicle control unit 101 via the vehicle interior communication unit 106.

The in-vehicle detection unit 103 supplies vehicle information obtained by detecting the status of the vehicle 1 (vehicle information 51 in FIG. 6 which will be explained later) to the in-vehicle control unit 101. The vehicle information can include, for example, vehicle position information indicating the present location (position) of the vehicle 1 equipped with the in-vehicle device 100, vehicle traveling direction information indicating a traveling direction of the vehicle 1, vehicle information generation time information indicating a time of the detection, speed (vehicle speed) information on the vehicle 1, and so forth.

The in-vehicle control unit 101 recognizes the object (e.g., a pedestrian, another vehicle, an obstacle or the like) in the vicinity of the vehicle 1 based on the detection information from the detection unit 108 (e.g., various types of sensors) obtained via the vehicle interior communication unit 106 and makes the vehicle exterior communication unit 105 deliver the recognition information via the network 300. Further, the in-vehicle control unit 101 updates the recognition information by using information obtained from the vehicle exterior communication unit 105 and generates update notification information (update notification information 7 shown in FIG. 8 which will be explained later) for notifying the mobile terminal device 200 that the recognition information has been updated.

The in-vehicle storage unit 102 stores, for example, the recognition information generated by the in-vehicle control unit 101 and including the detection information indicating the result of the detection of the object (e.g., a pedestrian, another vehicle, an obstacle or the like) in the vicinity of the vehicle 1. The in-vehicle storage unit 102 may also store a recognition support program to be executed by the in-vehicle control unit 101.

The in-vehicle information presentation unit 104 can include a display as a display unit for displaying information and a speaker as an audio output unit for outputting sound. The in-vehicle information presentation unit 104 may also be a video signal output terminal that supplies a video signal to a display externally attached to the in-vehicle device 100. The in-vehicle information presentation unit 104 may also be an audio signal output terminal that supplies an audio signal to a speaker externally attached to the in-vehicle device 100. The in-vehicle information presentation unit 104 may also be a different type of information presentation means such as a vibrator or a light-emitting device as long as the information presentation means is a device that presents information to the user of the in-vehicle device 100 (e.g., a driver of the vehicle 1, a passenger in the vehicle 1, or both of them) based on a command from the in-vehicle control unit 101.

The vehicle exterior communication unit 105 has a function of exchanging data with a device outside the vehicle by means of vehicle-vehicle communication as communication between the vehicle 1 and another vehicle or road-vehicle communication as communication between the vehicle 1 and a communication device on a road.

Figure 3:
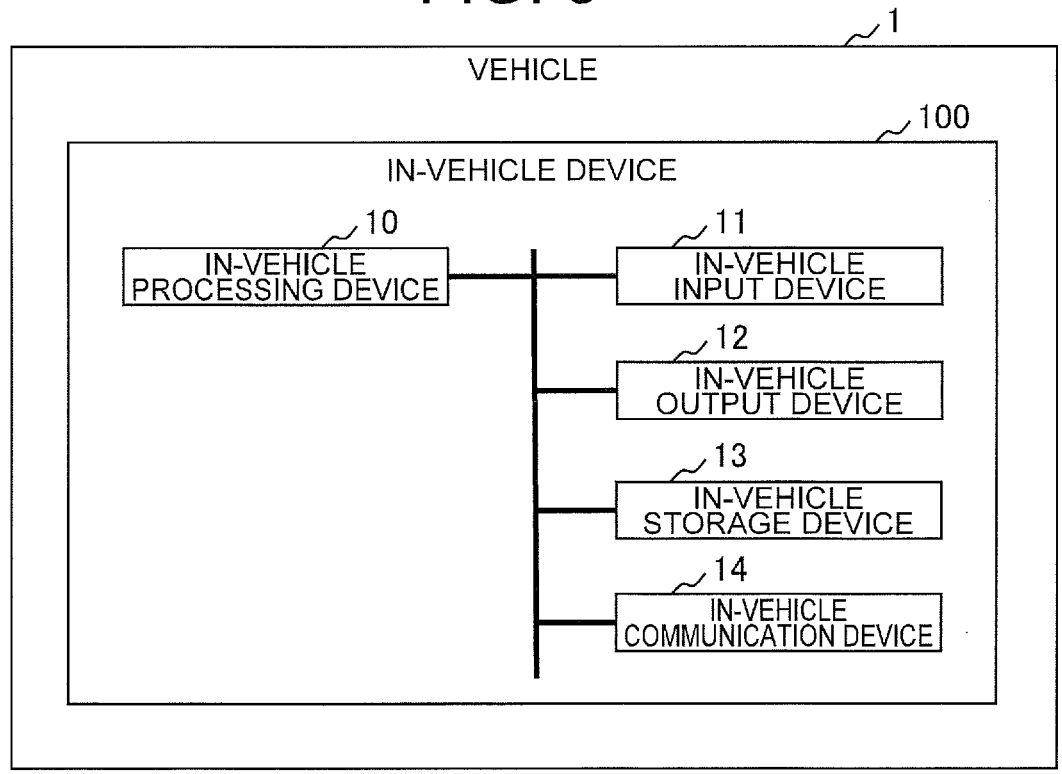
FIG. 3 is a diagram schematically showing an example of the hardware configuration of the in-vehicle device shown in FIG. 2.

FIG. 3 is a diagram schematically showing an example of the hardware configuration of the in-vehicle device 100 shown in FIG. 2. As shown in FIG. 3, the in-vehicle device 100 includes an in-vehicle processing device 10, an in-vehicle input device 11, an in-vehicle output device 12, an in-vehicle storage device 13 and an in-vehicle communication device 14 as the hardware configuration.

The in-vehicle processing device 10 is a CPU (Central Processing Unit), for example. The in-vehicle processing device 10 is connected to the other hardware devices via a bus and controls the hardware devices. The in-vehicle processing device 10 reads out programs such as an OS (Operating System) as basic software, drivers as software for driving devices, and applications from the in-vehicle storage device 13 and executes the programs. The in-vehicle processing device 10 uses the in-vehicle input device 11 and the in-vehicle output device 12 in a case where data is inputted and outputted from/to a peripheral device. The in-vehicle communication device 14 is used for communication with devices inside or outside the vehicle 1. The in-vehicle control unit 101 in FIG. 2 is implemented by the execution of the programs stored in the in-vehicle storage device 13 in FIG. 3 by the in-vehicle processing device 10, for example.

The in-vehicle input device 11 is a touch panel, a keyboard or a GPS (Global Positioning System) device, for example. The in-vehicle detection unit 103 in FIG. 2 corresponds to the in-vehicle input device 11 in FIG. 3.

The in-vehicle output device 12 is, for example, a display such as an LCD (Liquid Crystal Display) or an HUD (Head-Up Display) or an audio output device such as a speaker. In a case where some sort of notification is made to the user of the in-vehicle device 100 by means of vibration, a vibrator is also included in the in-vehicle output device 12. The in-vehicle information presentation unit 104 in FIG. 2 corresponds to the in-vehicle output device 12 in FIG. 3.

The in-vehicle storage device 13 is a ROM (Read Only Memory), a RAM (Random Access Memory), an HDD (Hard Disk Drive) or an SSD (Solid State Drive), for example. The in-vehicle storage device 13 stores programs and the like to be processed in the in-vehicle processing device 10. The in-vehicle storage unit 102 in FIG. 2 corresponds to the in-vehicle storage device 13 in FIG. 3.

The in-vehicle communication device 14 is a module for performing communication with the network 300 outside the in-vehicle device 100 and the inside vehicle interior network. In the case of the in-vehicle device 100, a CAN (Controller Area Network) is an example of the vehicle interior network. The vehicle exterior communication unit 105 in FIG. 2 corresponds to a part of the in-vehicle communication device 14 in FIG. 3. The vehicle interior communication unit 106 in FIG. 2 corresponds to a part of the in-vehicle communication device 14 in FIG. 3.

Figure 4:
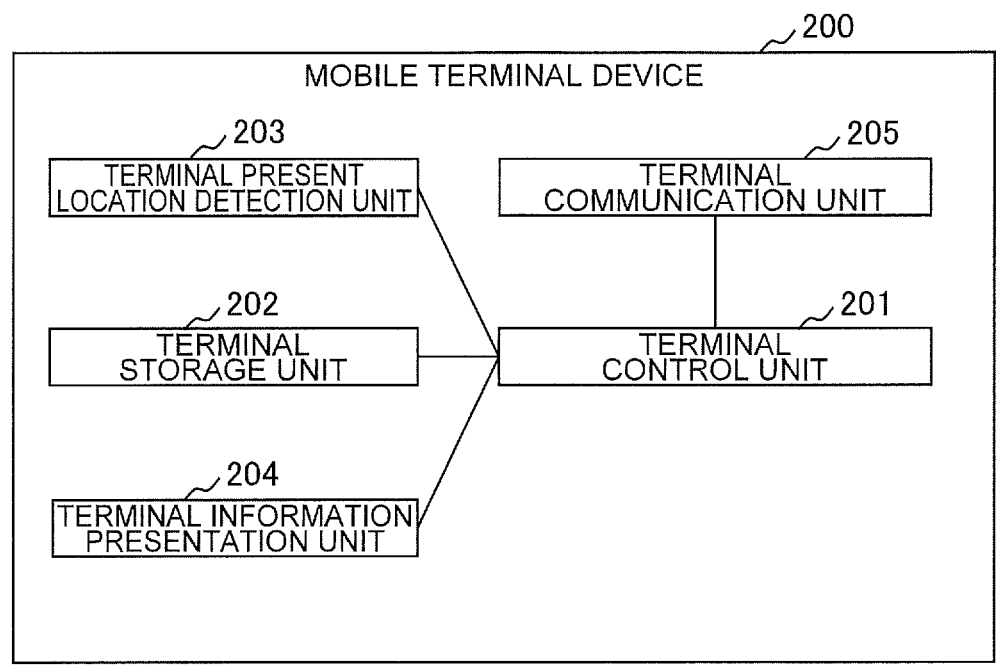
FIG. 4 is a functional block diagram schematically showing an example of the configuration of a mobile terminal device in the first embodiment.

FIG. 4 is a functional block diagram schematically showing an example of the configuration of the mobile terminal device 200 in the first embodiment. As shown in FIG. 4, the mobile terminal device 200 includes a terminal communication unit 205 that performs communication via the network 300, a terminal present location detection unit 203 that detects a position of the object as the position where the mobile terminal device (host terminal) 200 exists, and a terminal control unit 201. The mobile terminal device 200 may further include a terminal storage unit 202 that stores information and a terminal information presentation unit 204 that displays an image or outputs sound.

The terminal control unit 201 judges whether the object (e.g., a pedestrian, another vehicle or the like) equipped with the mobile terminal device 200 has been recognized by the in-vehicle device 100 or not based on the recognition information acquired from the in-vehicle device 100 of the vehicle 1 via the terminal communication unit 205 and the present position of the mobile terminal device 200 acquired from the terminal present location detection unit 203 and makes the terminal information presentation unit 204 present the recognition information or the result of the judgment by the terminal control unit 201 to the user of the mobile terminal device 200.

The terminal storage unit 202 is capable of storing the contents processed by the terminal control unit 201. The terminal storage unit 202 may also store a recognition support program to be executed by the terminal control unit 201.

The terminal present location detection unit 203 supplies information, such as the present location (position) of the mobile terminal device 200, a traveling direction of the mobile terminal device 200, and a position detection time as the time when these items of information were detected, to the terminal control unit 201.

The terminal information presentation unit 204, including a display and a speaker, presents information to the user of the mobile terminal device 200 based on a command from the terminal control unit 201.

The terminal communication unit 205 exchanges data with another device by the vehicle-vehicle communication, the road-vehicle communication, or a different means.

Figure 5:
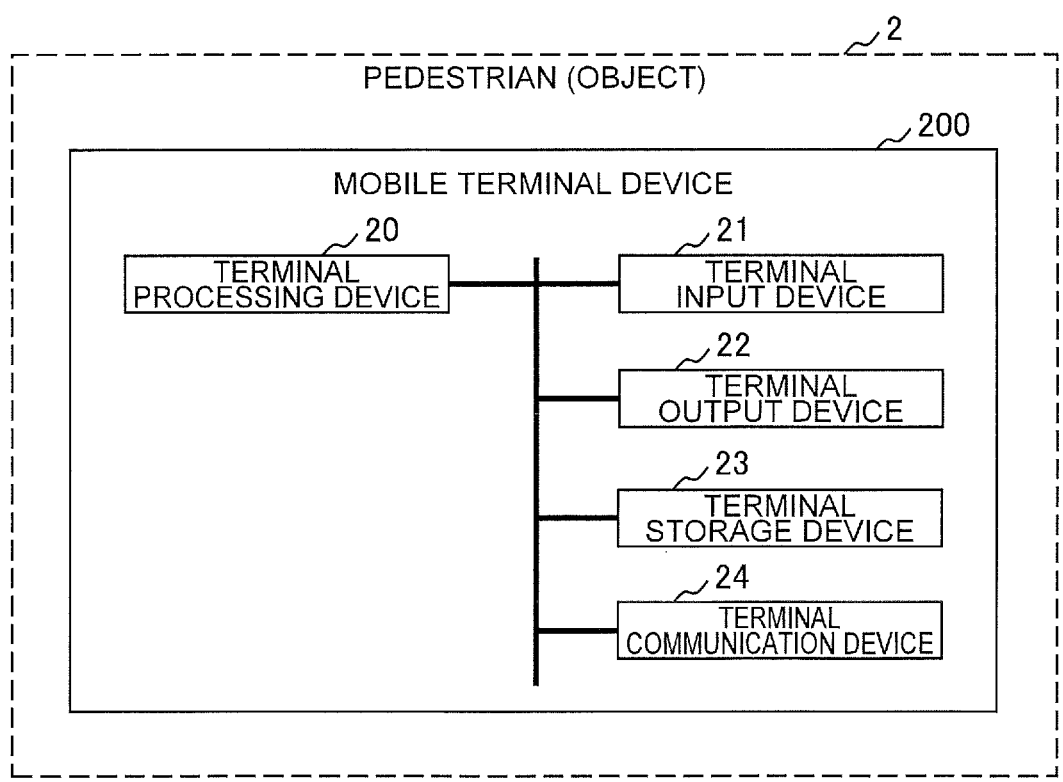
FIG. 5 is a diagram schematically showing an example of the hardware configuration of the mobile terminal device shown in FIG. 4.

FIG. 5 is a diagram schematically showing an example of the hardware configuration of the mobile terminal device 200 shown in FIG. 4. As shown in FIG. 5, the mobile terminal device 200 includes a terminal processing device 20, a terminal input device 21, a terminal output device 22, a terminal storage device 23 and a terminal communication device 24 as the hardware configuration.

The terminal processing device 20 is a CPU, for example, is connected to the other hardware devices via a bus, and controls the hardware devices. The terminal processing device 20 reads out a program from the terminal storage device 23 and executes the program. The terminal processing device 20 uses the terminal input device 21 and the terminal output device 22 in a case where data is inputted and outputted from/to a peripheral device. The terminal communication device 24 is used for communication with a device outside the mobile terminal device 200. The terminal control unit 201 in FIG. 4 is implemented by the execution of the program stored in the terminal storage device 23 in FIG. 5 by the terminal processing device 20, for example.

The terminal input device 21 is a touch panel, a keyboard or a GPS device, for example. The terminal present location detection unit 203 in FIG. 4 corresponds to the terminal input device 21 in FIG. 5.

The terminal output device 22 is, for example, a display device such as an LCD or an HUD, an audio output device such as a speaker, a vibrator, or the like. The terminal information presentation unit 204 in FIG. 4 corresponds to the terminal output device 22 in FIG. 5.

The terminal storage device 23 is a ROM, a RAM, an HDD or an SSD, for example. The terminal storage device 23 stores a program and the like to be processed in the terminal processing device 20. The terminal storage unit 202 in FIG. 4 is implemented by the terminal storage device 23 in FIG. 5.

The terminal communication device 24 is a module used for communication with a network outside the mobile terminal device 200. The terminal communication unit 205 in FIG. 4 corresponds to a part of the terminal communication device 24 in FIG. 5.

Figure 6:
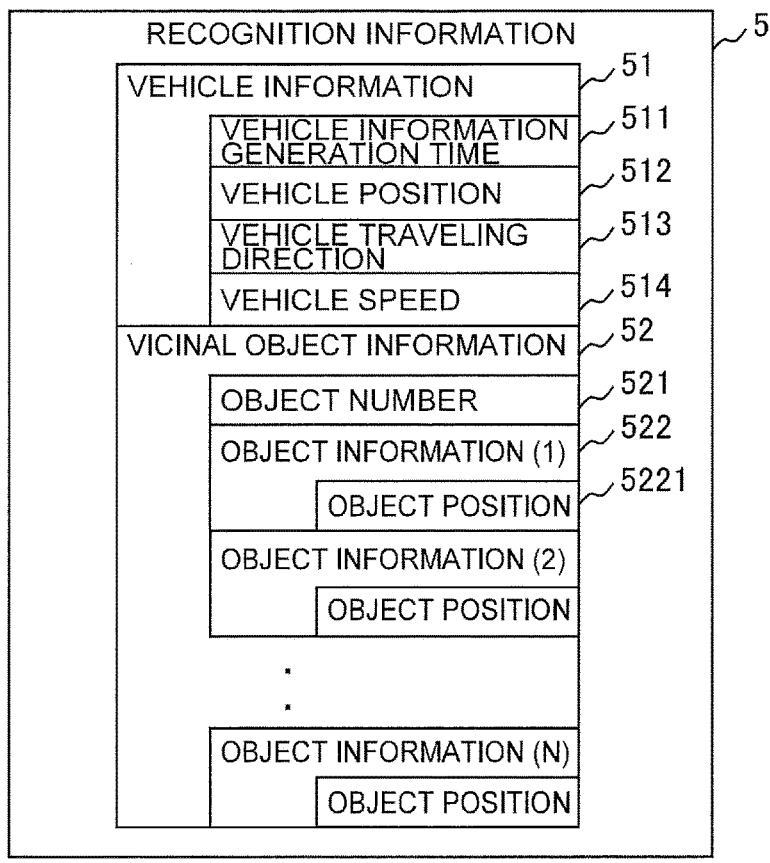
FIG. 6 is a diagram showing an example of the configuration of recognition information delivered from the in-vehicle device to the mobile terminal device.

FIG. 6 is a diagram showing an example of the recognition information 5 delivered from the in-vehicle device 100 to the network 300. As shown in FIG. 6, the recognition information 5 includes the vehicle information (host vehicle information) 51 and vicinal object information (vicinal body information) 52.

The vehicle information 51 includes information indicating the status of the vehicle (host vehicle) 1 equipped with the in-vehicle device 100. As shown in FIG. 6, the vehicle information 51 can include, for example, the vehicle position information (host vehicle position information) 512, the vehicle traveling direction information 513, the vehicle speed information 514, and the vehicle information generation time information 511 indicating the time when these items of information were generated. The vehicle information 51 is acquired by the in-vehicle detection unit 103 and stored in the in-vehicle storage unit 102, for example.

The vicinal object information 52 includes information indicating the status of the object existing in the vicinity of the vehicle 1 equipped with the in-vehicle device 100. As shown in FIG. 6, the vicinal object information 52 can include, for example, object number information 521 indicating the number of objects existing in the vicinity of the vehicle 1 and object information 522 regarding each of the objects existing in the vicinity of the vehicle 1 (i.e., 0 or more pieces of object information). The object information (1) to (N), namely, the object information 522 can include object position information 5221 indicating the position of each of the objects existing in the vicinity of the vehicle 1. Here, N is a positive integer. The vicinal object information 52 is acquired by the in-vehicle control unit 101 via the vehicle interior communication unit 106 and stored in the in-vehicle storage unit 102, for example.

Figure 7:
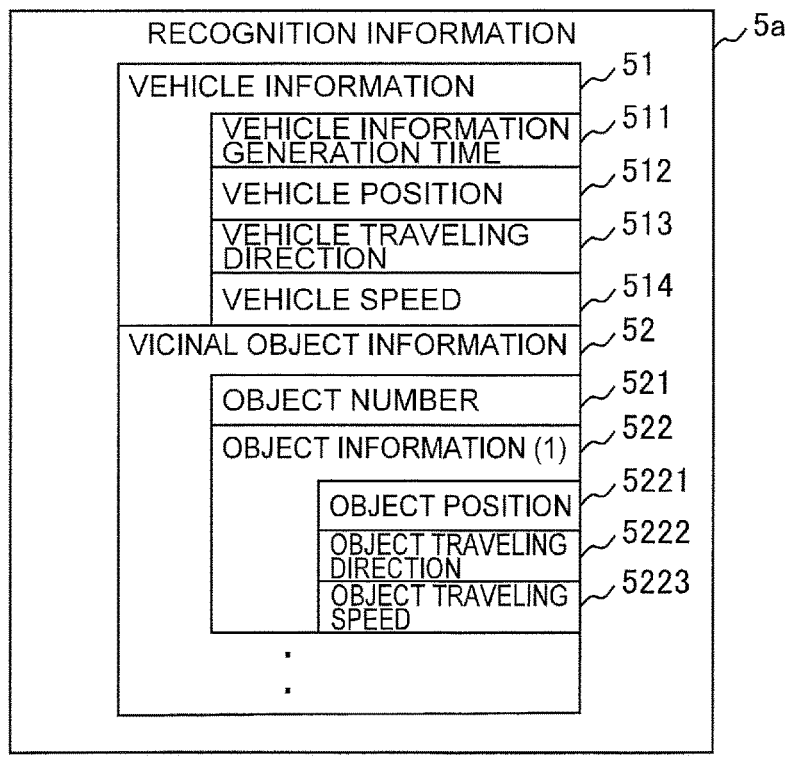
FIG. 7 is a diagram showing another example of the configuration of the recognition information delivered from the in-vehicle device to the mobile terminal device.

However, the recognition information 5 may include items other than the items described above. For example, as in recognition information 5a shown in FIG. 7, the object information 522 may include object traveling direction information 5222 indicating a traveling direction of each of the objects existing in the vicinity of the vehicle 1 and object traveling speed information 5223 indicating a traveling speed of each of the objects existing in the vicinity of the vehicle 1.

The vehicle position information 512, as information indicating the present location as the point where the vehicle 1 exists, can be acquired from the in-vehicle detection unit 103, for example. It, indicating the position of the in-vehicle device 100 at the time when the in-vehicle device 100 generated the recognition information 5, can be expressed by a combination of the latitude and the longitude, for example.

The vehicle traveling direction information 513 is information indicating the traveling direction of the vehicle equipped with the in-vehicle device 100 at the time when the in-vehicle device 100 generated the recognition information 5. The vehicle traveling direction information 513 can be expressed by a value from 0° to 359° supposing that due north is 0°, for example.

The vehicle speed information 514 is information indicating a speed of the vehicle equipped with the in-vehicle device 100 at the time when the in-vehicle device 100 generated the recognition information 5. The vehicle speed information 514 is obtained from an ECU (Electronic Control Unit) in the vehicle via the vehicle interior communication unit 106.

The object number information 521 indicates the number of pieces of the object information 522 included in the recognition information 5. The object information 522 stores information on the object recognized by the vehicle equipped with the in-vehicle device 100 by using information from a camera or a radar connected via the vehicle interior communication unit 106. In the first embodiment, the object information 522 is formed exclusively of the object position information 5221. The object position information 5221 can be expressed by a combination of the latitude and the longitude similarly to the vehicle position information 512.

Figure 8:
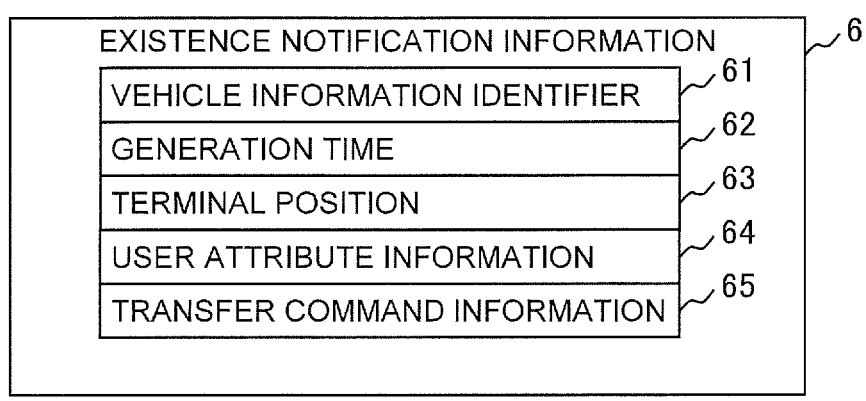
FIG. 8 is a diagram showing an example of the configuration of existence notification information transmitted from the mobile terminal device to the in-vehicle device.

FIG. 8 is a diagram showing an example of existence notification information 6 transmitted from the mobile terminal device 200 to the network 300. As shown in FIG. 8, the existence notification information 6 includes a vehicle information identifier 61, generation time information 62 and terminal position information 63. The existence notification information 6 may also include transfer command information 65 besides these items of information.

The vehicle information identifier 61 is information for identifying a destination (transmission destination) of the existence notification information 6. As the vehicle information identifier 61, the vehicle information 51 in the received recognition information 5 can be directly used, for example. The generation time information 62 indicates a time when the mobile terminal device 200 generated the existence notification information 6. The terminal position 63 is acquired from the terminal present location detection unit 203, indicates a position of the mobile terminal device 200 at the time when the mobile terminal device 200 generated the existence notification information 6 and can be expressed by a combination of the longitude and the latitude, for example.

Figure 9:
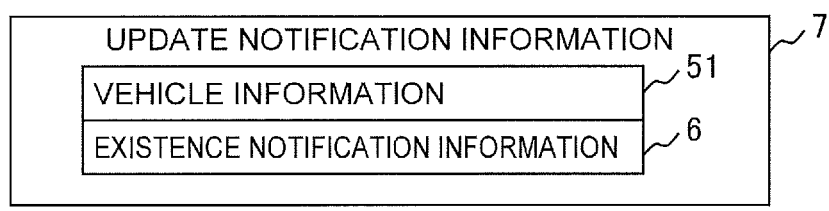
FIG. 9 is a diagram showing an example of the configuration of update notification information delivered from the in-vehicle device to the mobile terminal device.

FIG. 9 is a diagram showing an example of the update notification information 7 transmitted from the in-vehicle device 100 to the network 300. As shown in FIG. 9, the update notification information 7 includes vehicle information 51 (the same as the vehicle information 51 shown in FIG. 6) and existence notification information 6 (the same as the existence notification information 6 shown in FIG. 8).

In the recognition support system 400 in the first embodiment, first, the in-vehicle device 100 detects the vehicle present location of the vehicle 1, acquires the detection information on the object 2 from the detection unit 108, generates the recognition information 5 including the position information 5221 on the object 2 based on the vehicle present location and the detection information on the object 2, and delivers the recognition information 5. This process may be implemented by the execution of the recognition support program stored in the in-vehicle storage unit 102 of the in-vehicle device 100 by the CPU constituting the in-vehicle control unit 101.

Subsequently, the mobile terminal device 200 receives the recognition information 5, detects the terminal present location as the present location of the mobile terminal device 200, judges whether the in-vehicle device 100 has recognized the existence of the object equipped with the mobile terminal device 200 (first object as one of a plurality of objects) or not based on the terminal present location and the received recognition information 5, and transmits the existence notification information 6 to the in-vehicle device 100 when the in-vehicle device 100 is judged to have not recognized the existence of the object. This process may be implemented by the execution of the recognition support program stored in the terminal storage unit 202 of the mobile terminal device 200 by the CPU constituting the terminal control unit 201. By executing such a process, the mobile terminal device 200 can make the in-vehicle device 100 recognize the object that has not been recognized by the in-vehicle device 100.

Subsequently, the in-vehicle control unit 101 may receive the existence notification information 6 via the vehicle exterior communication unit 105, update the recognition information 5 based on the received existence notification information 6, and transmit the update notification information 7, for notifying that the update has been made, to the mobile terminal device 200. This process may be implemented by the execution of the program stored in the in-vehicle storage unit 102 of the in-vehicle device 100 by the CPU constituting the in-vehicle control unit 101. By such a process, the user of the mobile terminal device 200 (a pedestrian, a driver of another vehicle, or the like) can learn that the in-vehicle device 100 has recognized the mobile terminal device (host terminal) 200 and get a sense of security.

(1-2) Operation

Next, the operation of the recognition support system 400 will be described with reference to FIG. 1 to FIG. 10. Incidentally, in the following description, a case where the recognition support system 400 includes one in-vehicle device 100 and one mobile terminal device 200 will be described.

Figure 10:
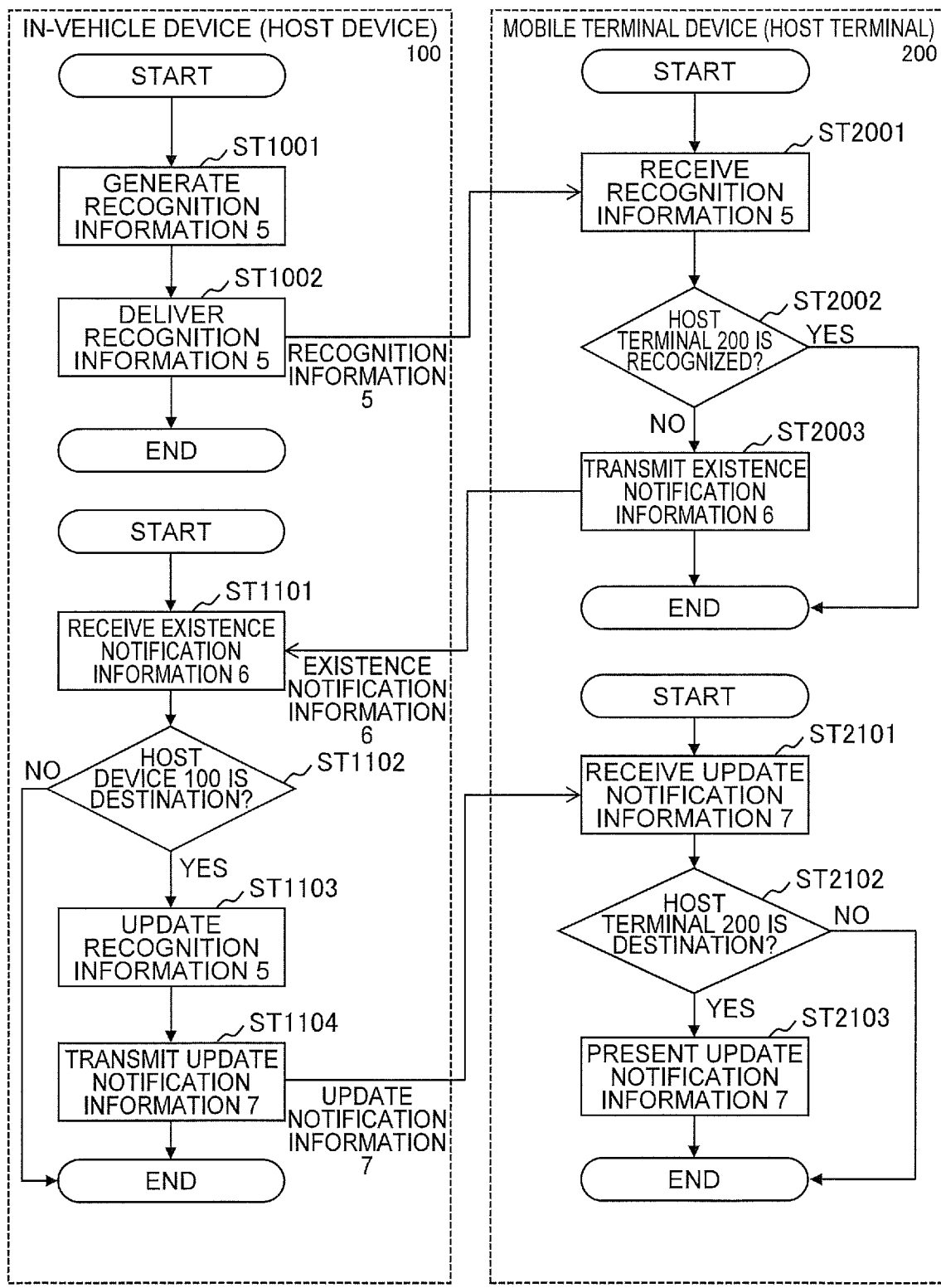
FIG. 10 is a flowchart showing an example of a recognition support method in the first embodiment.

FIG. 10 is a flowchart showing the operation of the in-vehicle device 100 and the mobile terminal device 200 in the first embodiment (i.e., the recognition support method in the first embodiment). Note that each of the processes which are shown between "START" and "END" in FIG. 10 is a process which is executed independently. For example, a process from a step ST1001 to a step ST1002 is a process executed repeatedly in a periodical manner. A Process from a step ST2001 to a step ST2003 is executed when the mobile terminal device 200 has received the recognition information, a process from a step ST1101 to a step ST1104 is executed when the in-vehicle device 100 has received the existence notification, and a process from a step ST2101 to a step ST2103 is executed when the mobile terminal device 200 has received the update notification information.

In the step ST1001, the in-vehicle control unit 101 generates the recognition information 5 based on information acquired from the in-vehicle detection unit 103 and the vehicle interior communication unit 106 and stores the recognition information 5 in the in-vehicle storage unit 102. Specifically, the in-vehicle control unit 101 acquires the vehicle information generation time information 511, the vehicle position information 512 and the vehicle traveling direction information 513 from the in-vehicle detection unit 103, and acquires the vehicle speed information 514 and the object information 522 (including the object position information 5221) from the detection unit 108 via the vehicle interior communication unit 106. Further, the in-vehicle control unit 101 identifies the object number information 521 by counting the number of pieces of the object information 522 acquired from the vehicle interior communication unit 106. Incidentally, the detection unit (e.g., measurement device) 108 which is a device capable of detecting an object outside the vehicle and identifying the position of the object is connected to the vehicle interior network. Methods for detecting the position, the traveling direction and the traveling speed of the object outside the vehicle are publicly known techniques and are not particularly limited. For example, as publicly known methods for detecting the position of the object outside the vehicle, there are a method using a radar, a method using an image obtained by camera photographing, a method using LIDAR (Light Detection and Ranging), and so forth. The traveling direction of the object and the traveling speed of the object can be detected by repeating the position detection of the object at certain time intervals. A case where the vehicle 1 equipped with the in-vehicle device 100 has not been able to recognize the pedestrian carrying the mobile terminal device 200 will be mainly described below.

In the next step ST1002, the in-vehicle control unit 101 delivers the recognition information 5 generated in the step ST1001 to the network 300 by using the vehicle exterior communication unit 105. In this example, the in-vehicle control unit 101 broadcasts the recognition information 5 without specifying the destination. The recognition information 5 delivered from the in-vehicle device 100 may be delivered via another in-vehicle device, another mobile terminal device, or a repeater belonging to the network 300 before reaching the mobile terminal device 200.

In the next step ST2001, the terminal communication unit 205 receives the recognition information 5.

In the next step ST2002, the terminal control unit 201 judges whether the in-vehicle device 100 has recognized the mobile terminal device 200 or not based on 0 or more pieces of object position information 5221 included in the recognition information 5 received by the terminal communication unit 205 and the position of the mobile terminal device (host terminal) 200 acquired from the terminal present location detection unit 203. As an example of the criterion for the judgment, there is a method of judging that "the in-vehicle device 100 has recognized the mobile terminal device 200" (YES in the step ST2002) and ending the process starting from the step ST2001 if position information whose contents coincide with the position of the mobile terminal device (host terminal) 200 acquired from the terminal present location detection unit 203 exists in the object position information 5221. As another criterion for the judgment, there is a method of judging that "the in-vehicle device 100 has recognized the mobile terminal device 200" (YES in the step ST2002) and ending the process starting from the step ST2001 if a distance obtained from the object position information 5221 and the position of the mobile terminal device (host terminal) 200 acquired from the terminal present location detection unit 203 is less than a predetermined threshold value. If the condition is not satisfied in the step ST2002, the judgment is NO and the process advances to the step ST2003.

In the step ST2003, the terminal control unit 201 generates the existence notification information 6 based on information acquired from the terminal present location detection unit 203, stores the existence notification information 6 in the terminal storage unit 202, and transmits the existence notification information 6 to the network 300 by using the terminal communication unit 205. Specifically, in the existence notification information 6, the vehicle information 51 included in the received recognition information 5 is set to the vehicle information identifier 61, and values acquired from the terminal present location detection unit 203 are set to the generation time information 62 and the terminal position 63.

In the step ST1101, the vehicle exterior communication unit 105 receives the existence notification information 6, as a message indicating the existence of the object (pedestrian or the like), from the mobile terminal device 200.

In a step ST1102, the in-vehicle control unit 101 judges whether the in-vehicle device (host device) 100 is the destination of the existence notification information 6 or not by comparing the vehicle information 51 in the recognition information 5 stored in the in-vehicle storage unit 102 with the vehicle information identifier 61 in the received existence notification information 6. When the vehicle information 51 and the vehicle information identifier 61 coincide with each other, the in-vehicle control unit 101 judges that the in-vehicle device (host device) 100 is the destination of the existence notification information 6 (YES in the step ST1102) and advances the process to a step ST1103. When it is judged that the in-vehicle device (host device) 100 is not the destination of the existence notification information 6 (NO in the step ST1102), the process starting from the step ST1101 is ended.

In the step ST1103, the in-vehicle control unit 101 updates the recognition information 5 by adding the terminal position information 63 in the existence notification information 6 to the recognition information 5 stored in the in-vehicle storage unit 102. Incidentally, it is possible to change the control of the automated driving by the in-vehicle device 100 (e.g., lane change, deceleration or stoppage) by using the updated recognition information 5, it is possible to give notice of the detection of the pedestrian by transmitting the recognition information 5 to the vehicle interior communication unit 106 in a case where the control of the automated driving is performed by an ECU different from the in-vehicle device 100 and belonging to the vehicle interior network, and it is possible to notify the driver and the passenger of the vehicle equipped with the in-vehicle device 100 of the detection of the mobile terminal device carried by the pedestrian by using the in-vehicle information presentation unit 104.

In the step ST1104, the in-vehicle control unit 101 generates the update notification information 7 and transmits the update notification information 7 to the network 300 by using the vehicle exterior communication unit 105. The vehicle information 51 included in the update notification information 7 is generated by the process explained in the step ST1001. As the existence notification information 6 included in the update notification information 7, the existence notification information 6 received in the step ST1101 can be used without change.

In the next step ST2101, the terminal communication unit 205 receives the update notification information 7.

In the next step ST2102, the terminal control unit 201 judges whether the mobile terminal device (host terminal) 200 is the destination of the update notification information 7 or not by comparing the existence notification information 6 stored in the terminal storage unit 202 in the step ST2003 with the existence notification information 6 included in the update notification information received in the step ST2101. If it is judged that the mobile terminal device (host terminal) 200 is the destination of the update notification information 7 (YES in the step ST2102), the process is advanced to the step ST2103. If it is judged that the mobile terminal device (host terminal) 200 is not the destination of the update notification information 7 (NO in the step ST2102), the process starting from the step ST2101 is ended.

In the step ST2103, the terminal control unit 201 presents information, meaning that the vehicle equipped with the in-vehicle device 100 has recognized the mobile terminal device 200, by using the terminal information presentation unit 204.

As above, the mobile terminal device 200 in the first embodiment is capable of judging whether the mobile terminal device (host terminal) 200 has been recognized by the in-vehicle device 100 or not by using the vicinal object information 52 included in the recognition information 5 received from the in-vehicle device 100 by using the terminal communication unit 205, and transmitting the existence notification information 6 to the in-vehicle device 100 via the network 300 by using the communication unit 205 in a case where it is judged that the mobile terminal device (host terminal) 200 has not been recognized. Subsequently, the in-vehicle device 100 is capable of updating the recognition information 5 stored in the in-vehicle storage unit 102 by using the existence notification information 6 received by using the vehicle exterior communication unit 105.

Finally, the in-vehicle device 100 that updated the recognition information 5 generates the update notification information 7 and transmits the update notification information 7 to the network by using the vehicle exterior communication unit 105, and the mobile terminal device 200 that received the update notification information 7 by using the terminal communication unit 205 presents the information meaning that the vehicle equipped with the in-vehicle device 100 has recognized the mobile terminal device 200 by using the terminal information presentation unit 204.

(1-3) Effect

As described above, in the first embodiment, an advantage is obtained in that it becomes possible to recognize the mobile terminal device 200 carried by a pedestrian as an object that could not be recognized only by the vehicle 1 equipped with the in-vehicle device 100. In other words, the ability of the vehicle 1 to recognize an object outside the vehicle increases and thus safer driving of the vehicle 1 becomes possible.

Further, in the first embodiment, the in-vehicle device 100 is capable of causing the mobile terminal device 200 to present information indicating that the in-vehicle device 100 has recognized the mobile terminal device 200 carried by the pedestrian, and thus an advantage is obtained in that the pedestrian carrying the mobile terminal device 200 can learn the status of recognition of the object by the in-vehicle device 100 of the vehicle 1.

Furthermore, even when the position information on the mobile terminal device 200 is included in the vicinal object information 52 in the recognition information 5, the mobile terminal device 200 can present information for calling attention to the pedestrian. It is desirable to allow the user of the mobile terminal device 200 to make settings in regard to in which cases the mobile terminal device 200 should present the attention calling information.

(1-4) Modification

While a case where the existence notification information 6 received by the in-vehicle device 100 is used only in the in-vehicle device (host device) 100 has been described in the above description, the in-vehicle device 100 of the vehicle 1 may transfer the existence notification information 6 to another in-vehicle device installed in another vehicle. This achieves an advantage in that another in-vehicle device of another vehicle can recognize the existence of the mobile terminal device 200 without communicating with the mobile terminal device 200.

In a case where the in-vehicle device 100 transfers the existence notification information 6 to another in-vehicle device, it is desirable to add an item of transfer source information to the existence notification information 6 so that it is found that the existence notification information 6 is not information transmitted directly from the mobile terminal device 200 but information transferred from the in-vehicle device 100.

While a case where the existence notification information 6 is transferred to another in-vehicle device by judgment of the in-vehicle device 100 has been described above, the mobile terminal device 200 may explicitly command the in-vehicle device 100 to transfer the existence notification information 6 to another in-vehicle device. This can be implemented by adding an item of transfer command information (reference character 65 in FIG. 8) indicating the transfer command to the existence notification information 6 and referring to the added item by the in-vehicle device 100. There is a method of issuing this transfer command by the mobile terminal device 200 in a case where the distance between the in-vehicle device 100 and the mobile terminal device 200 obtained from the vehicle information 51 in the recognition information 5 received by the mobile terminal device 200 and the present location supplied by the terminal present location detection unit 203 is shorter than a predetermined distance threshold or in a case where a value obtained by dividing that distance by the vehicle speed information 514 is less than a predetermined time threshold. Namely, this is a method in which the transfer command by the mobile terminal device 200 is issued in a case where the automated driving control or the driver's driving operation becomes too late in regard to the vehicle 1 equipped with the in-vehicle device 100 even if the existence notification information 6 is received.

Further, while the above description was given of a case where the existence notification information 6 is transmitted to the in-vehicle device 100 always in a case where the mobile terminal device 200 judges that the in-vehicle device (host device) 100 has not recognized the mobile terminal device 200, this operation may be executed selectively. For example, in a case where the recognition information 5 is received from a plurality of in-vehicle devices in a certain period, it is possible to transmit the existence notification information 6 only to an in-vehicle device that has not recognized the in-vehicle device (host device) 100 and is the closest to the in-vehicle device (host device) 100. With such a method, an advantage is obtained in that the amount of data transmitted to the network 300 can be reduced. Incidentally, combining the selective transmission of the existence notification information 6 with the command for the transfer to other in-vehicle devices makes it possible to supply the existence notification information 6 to a plurality of in-vehicle devices by transmitting the existence notification information 6 from the mobile terminal device 200 only once.

Further, while a case where the mobile terminal device 200 is carried by a "pedestrian" has been described above, it is also possible to previously store information on the attribute of the owner of the mobile terminal device 200, e.g., "adult", "child", "aged person" or "animal (pet)", in the terminal storage unit 202 and to add user attribute information (reference character 64 in FIG. 8) as the aforementioned attribute information to the existence notification information 6. With such a method, an advantage is obtained in that the in-vehicle device 100 receiving the existence notification information 6 is enabled to carry out information presentation or vehicle control corresponding to the attribute of the owner of the mobile terminal device 200. For example, it is possible to prepare a plurality of messages to be presented and to select and present a message suitable for a child as the object in a case where the attribute is "child". It becomes possible, for example, to control to travel slowly on the lookout for a child suddenly rushing out onto the road.

Incidentally, by installing the mobile terminal device 200 together with a signboard temporarily installed on a roadway, road shoulder or the like and making the attribute of the owner "signboard" or the like, it becomes possible to receive the existence notification information 6 before the installation is detected with a camera, a radar or the like and to carry out information presentation or vehicle control to avoid the installation.

(2) Second Embodiment (2-1) Configuration

Figure 11:
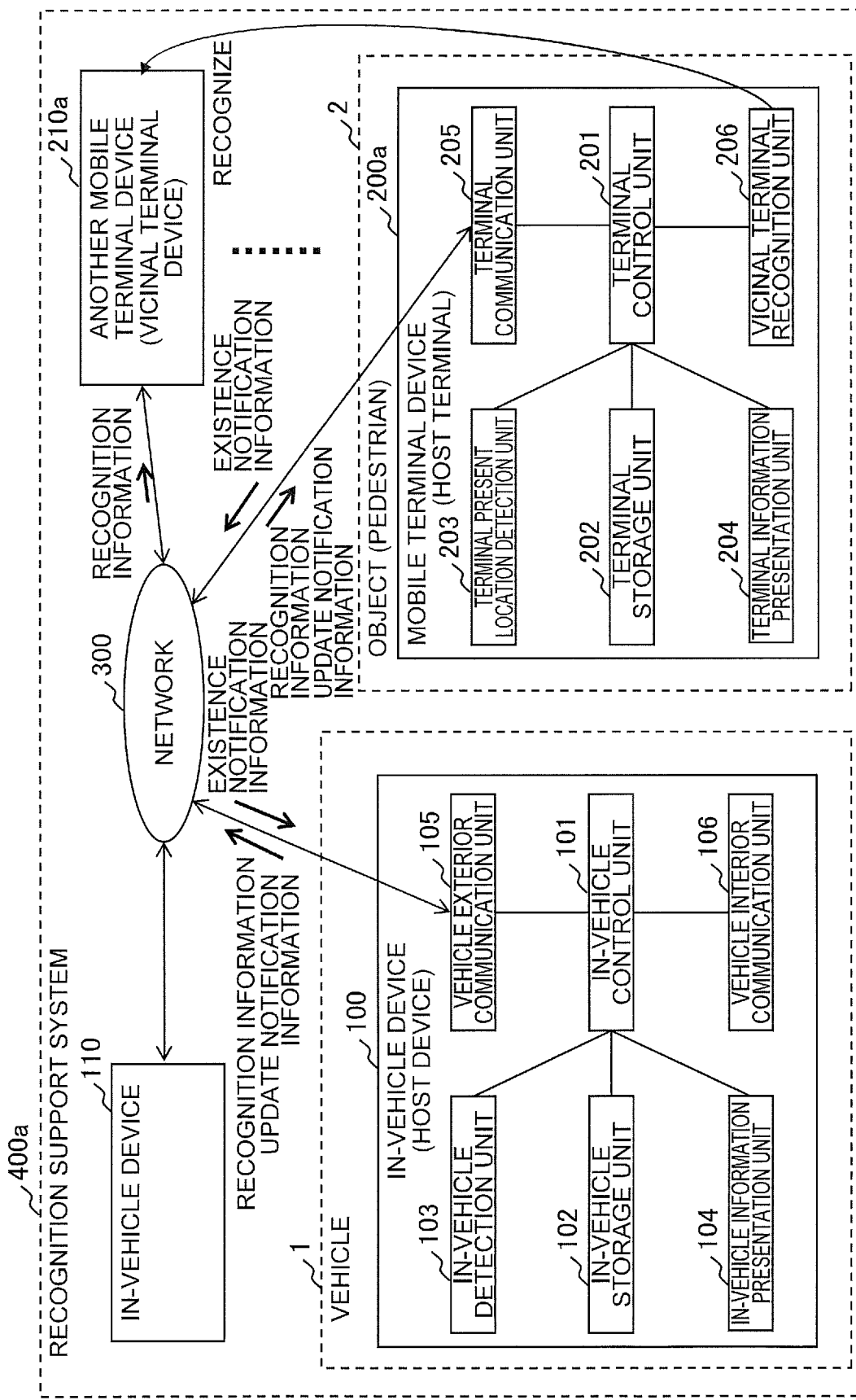
FIG. 11 is a functional block diagram schematically showing an example of the configuration of a recognition support system in a second embodiment of the present invention.

A second embodiment of the present invention will be described below by focusing on the difference from the first embodiment. FIG. 11 is a functional block diagram showing an example of the configuration of a recognition support system 400a in the second embodiment. The recognition support system 400a is a system capable of executing a recognition support method and a recognition support program in the second embodiment. As shown in FIG. 11, the recognition support system 400a is a system including the in-vehicle device 100 installed in the vehicle (host vehicle) 1 and a mobile terminal device 200a existing outside the vehicle 1. In FIG. 11, each component identical or corresponding to a component shown in FIG. 1 is assigned the same reference character as that shown in FIG. 1. The recognition support system 400a in the second embodiment differs from the recognition support system 400 in the first embodiment in that the mobile terminal device 200a includes a vicinal terminal recognition unit 206. The vicinal terminal recognition unit 206 of the mobile terminal device 200a detects other mobile terminal devices (e.g., vicinal terminal device 210a in FIG. 11) provided on other objects and existing in the vicinity of the mobile terminal device (host terminal) 200a. The vicinal terminal recognition unit 206 has functions similar to the function of the vehicle interior communication unit 106 of the in-vehicle device 100 and the function of the detection unit 108 in the vehicle 1.

(2-2) Operation

Figure 12:
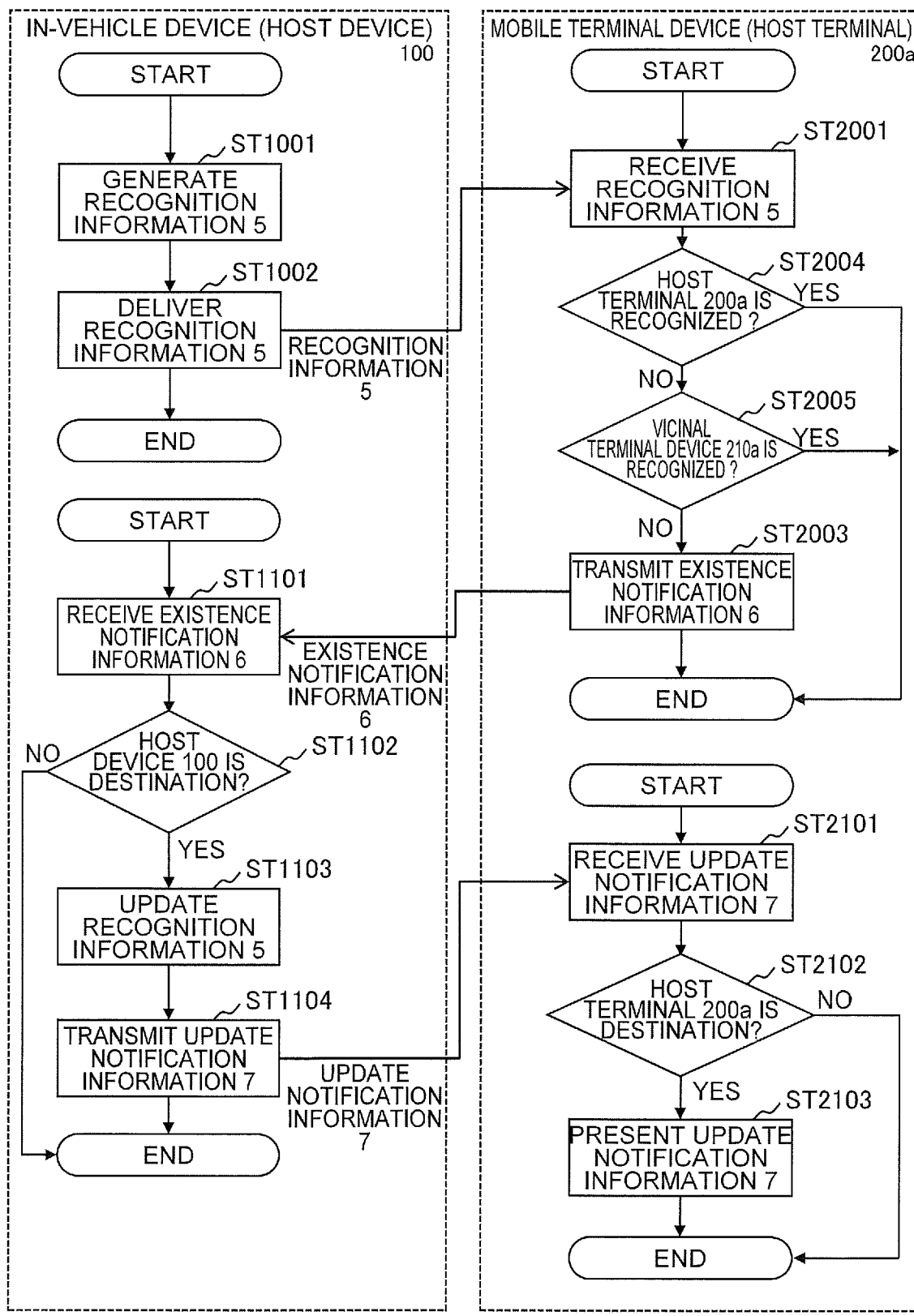
FIG. 12 is a flowchart showing an example of a recognition support method in the second embodiment.

FIG. 12 is a flowchart showing the operation of the in-vehicle device 100 and the mobile terminal device 200a in the second embodiment (i.e., the recognition support method in the second embodiment). In FIG. 12, the same process step as the process step shown in FIG. 10 is assigned the same reference character as that shown in FIG. 10. The process shown in FIG. 12 differs from the process shown in FIG. 10 in that processing of the step ST2002 in FIG. 10 is replaced with processing of a step ST2004 in FIG. 12 and in that processing of a step ST2005 in FIG. 12 is added. Thus, these two differences will be focused in the following description. Incidentally, FIG. 2 to FIG. 9 which have been used in the description of the first embodiment will also be referred to in the following description of the second embodiment.

The mobile terminal device 200a has previously collected information such as positions of vicinal terminal devices as other mobile terminal devices in the vicinity of the mobile terminal device 200a repeatedly at a certain period or irregularly by using the vicinal terminal recognition unit 206 and stored information on vicinal terminal devices whose distances from the mobile terminal device (host terminal) 200a are less than a predetermined threshold value (i.e., vicinal terminal devices close to the host terminal), included in the collected information, in the terminal storage unit 202 of the mobile terminal device 200a.

In the step ST2004 in FIG. 12, the mobile terminal device 200a makes a judgment similar to the judgement of the step ST2002 in FIG. 10. Specifically, in the step ST2004, the mobile terminal device 200a judges whether or not the in-vehicle device 100 has recognized the existence of the object equipped with the mobile terminal device (host terminal) 200a. If the judgment is YES, the process of the mobile terminal device 200a is ended. If the judgment is NO, the process is advanced to the step ST2005.

In the step ST2005 in FIG. 12, the terminal control unit 201 of the mobile terminal device 200a makes a judgment similar to the step ST2002 in FIG. 10 in regard to the vicinal terminal devices 210a stored in the terminal storage unit 202 (vicinal terminal devices whose distances from the mobile terminal device 200a as the host terminal are less than the threshold value). Specifically, in the step ST2005, the vicinal terminal recognition unit 206 of the mobile terminal device 200a detects another object equipped with a vicinal terminal device 210a and judges whether the in-vehicle device 100 has recognized the other object equipped with the vicinal terminal device 210a or not by using the result of the detection and the recognition information 5.

In the step ST2005, if there exists at least another object equipped with a vicinal terminal device 210a and recognized by the in-vehicle device 100, the judgment is YES and the process of the mobile terminal device 200a is ended. In the step ST2005, if there exists no other object equipped with a vicinal terminal device 210a and recognized by the in-vehicle device 100, the judgment is NO, the process advances to the step ST2003, and the existence notification information 6 indicating the existence of the mobile terminal device 200a as the host terminal is wirelessly transmitted to the in-vehicle device 100. Incidentally, in the step ST2005, the process advances to the step ST2003 also when no position information on a vicinal terminal device has been stored in the terminal storage unit 202.

(2-3) Effect

As described above, when whether the transmission of the existence notification information 6 is necessary or not is judged (i.e., in the judgment steps ST2004 and ST2005), the mobile terminal device 200a in the second embodiment checks whether or not the vicinal terminal device 210a has been recognized by the in-vehicle device 100. If a vicinal terminal device 210a as another mobile terminal device existing in the vicinity of the mobile terminal device 200a has been recognized by the in-vehicle device 100, it can be expected that a dangerous event hardly occurs when it travels in the vicinity of it. In such a situation, the degree of necessity of transmitting the existence notification information 6 from the mobile terminal device 200a is low. Thus, in the second embodiment, an advantage is obtained in that needless transmission of the existence notification information 6 by the mobile terminal device 200a can be reduced. Consequently, reception of the existence notification information 6 by the in-vehicle device 100 and the processing for updating the recognition information 5 accompanying the reception are reduced, and thereby an advantage of reducing the processing amount on the in-vehicle device 100 is also achieved.

While a case where the positions are stored in the terminal storage unit 202 in regard to the vicinal terminal devices 210a as other mobile terminal devices whose distances from the mobile terminal device 200a are less than the threshold value has been described above, it is also possible to judge whether the storing in the terminal storage unit 202 is necessary or not by using the traveling speed and the traveling direction of each vicinal terminal device 210a. This achieves an advantage in that the terminal storage unit 202 can be prevented from storing position information on another mobile terminal device whose traveling direction is opposite to that of the mobile terminal device (host terminal) 200a and another mobile terminal device traveling in the same direction as the mobile terminal device (host terminal) 200a but differing greatly in the traveling speed, namely, another mobile terminal device that will be at a long distance from the mobile terminal device (host terminal) 200a after a few seconds, for example (unnecessary information).

Except the features described above, the second embodiment is the same as the first embodiment.

DESCRIPTION OF REFERENCE CHARACTERS

1: vehicle (host vehicle), 2: object, 5, 5a: recognition information, 6: existence notification information, 7: update notification information, 10: in-vehicle processing device, 11: in-vehicle input device, 12: in-vehicle output device, 13: in-vehicle storage device, 14: in-vehicle communication device, 20: terminal processing device, 21: terminal input device, 22: terminal output device, 23: terminal storage device, 24: terminal communication device, 100: in-vehicle device (host device), 101: in-vehicle control unit, 102: in-vehicle storage unit, 103: in-vehicle detection unit, 104: in-vehicle information presentation unit, 105: vehicle exterior communication unit, 106: vehicle interior communication unit, 108: detection unit, 110: in-vehicle device (another device), 200, 200a: mobile terminal device (host terminal), 201: terminal control unit, 202: terminal storage unit, 203: terminal present location detection unit, 204: terminal information presentation unit, 205: terminal communication unit, 206: vicinal terminal recognition unit, 210, 210a: mobile terminal device (vicinal terminal device), 300: network, 400, 400a: recognition support system

What is claimed is:

1. An in-vehicle device that is installed in a vehicle including a detection unit for detecting an object and performs communication with a mobile terminal device including a terminal information presenter that presents information, the in-vehicle device comprising:

a vehicle exterior communicator to perform wireless communication;

an in-vehicle detector to detect a vehicle present location of the vehicle;

a vehicle interior communicator to acquire detection information on the object from the detection unit; and an in-vehicle controller to generate recognition information including position information on the object based on vehicle position information indicating the vehicle present location and the detection information on the object and make the vehicle exterior-communicator deliver the recognition information, wherein the vehicle exterior communicator receives existence notification information transmitted from the mobile terminal device when the mobile terminal device receiving the recognition information judges that the in-vehicle device does not recognize existence of a first object equipped with the mobile terminal device, and the recognition information that is delivered by the vehicle exterior communicator is information for making the terminal information presenter present that the in-vehicle device recognizes the first object when the mobile terminal device receiving the recognition information judges that the in-vehicle device recognizes the existence of the first object equipped with the mobile terminal device.

2. The in-vehicle device according to claim 1, wherein when the vehicle exterior communicator receives the existence notification information, the in-vehicle controller updates the recognition information based on the existence notification information and makes the vehicle exterior communicator transmit update notification information for notifying that the recognition information is updated to the mobile terminal device.

3. The in-vehicle device according to claim 1, wherein the existence notification information includes a vehicle identifier identifying the vehicle and position information on the mobile terminal device.

4. The in-vehicle device according to claim 1, wherein the vehicle exterior communicator receives the existence notification information when the mobile terminal device receiving the recognition information judges that the in-vehicle device does not recognize the existence of the first object equipped with the mobile terminal device and the in-vehicle device does not recognize a second object equipped with another mobile terminal device existing at a distance less than or equal to a predetermined threshold value from the mobile terminal device.

5. The in-vehicle device according to claim 1, wherein the in-vehicle controller transfers the existence notification information received from the mobile terminal device to another in-vehicle device.

6. The in-vehicle device according to claim 5, wherein the existence notification information includes an item of command information regarding the transfer to the another in-vehicle device.

7. The in-vehicle device according to claim 6, wherein the in-vehicle controller transfers the existence notification information to the another in-vehicle device based on the command information regarding the transfer.

8. A mobile terminal device that performs communication with an in-vehicle device installed in a vehicle including a detection unit for detecting an object, the mobile terminal device comprising:
a terminal communicator to receive recognition information when the in-vehicle device detects a vehicle present location of the vehicle, acquire detection information on an object existing in a vicinity of the vehicle, generate the recognition information including position information on the object based on the vehicle present location and the detection information on the object, and deliver the recognition information;
a terminal present location detector to detect a terminal present location of the mobile terminal device;
a terminal information presenter to present information; and
a terminal controller to judge whether the in-vehicle device recognizes existence of a first object equipped with the mobile terminal device or not based on the terminal present location and the recognition information received by the terminal communicator, make the terminal information presenter present that the in-vehicle device recognizes the first object when the terminal controller judges that the in-vehicle device recognizes the existence of the first object, and make the terminal communicator transmit existence notification information to the in-vehicle device when the terminal controller judges that the in-vehicle device does not recognize the existence of the first object.

9. The mobile terminal device according to claim 8, wherein the mobile terminal device receiving the recognition information transmits the existence notification information when the mobile terminal device judges that the in-vehicle device does not recognize the existence of the first object equipped with the mobile terminal device and the in-vehicle device does not recognize a second object equipped with another mobile terminal device existing at a distance less than or equal to a predetermined threshold value from the mobile terminal device.

10. The mobile terminal device according to claim 8, wherein the existence notification information includes user attribute information as attribute information on a user of the mobile terminal device.

11. The mobile terminal device according claim 8, wherein the terminal controller does not transmit the existence notification information indicating existence of the mobile terminal device when the terminal controller judges based on the recognition information that at least another mobile terminal device existing in a vicinity of the mobile terminal device is recognized by the in-vehicle device.

12. The mobile terminal device according to claim 8, wherein the terminal controller performs judgment on whether at least another mobile terminal device existing in a vicinity of the mobile terminal device is recognized by the in-vehicle device or not based on the recognition information in regard to the another mobile terminal device satisfying a predetermined condition regarding traveling directions or traveling speeds of the mobile terminal device and the another mobile terminal device and the terminal controller does not perform the judgment in regard to the another mobile terminal device not satisfying the condition.

13. A recognition support system comprising:
an in-vehicle device installed in a vehicle including a detection unit for detecting an object; and
a mobile terminal device to perform communication with the in-vehicle device, wherein the in-vehicle device includes:
a vehicle exterior communicator to perform wireless communication;
an in-vehicle detector to detect a vehicle present location of the vehicle;
a vehicle interior communicator to acquire detection information on the object from the detection unit; and
an in-vehicle controller to generate recognition information including position information on the object based on vehicle position information indicating the vehicle present location and the detection information on the object and make the vehicle exterior-communicator deliver the recognition information, and
the mobile terminal device includes:
a terminal communicator to perform wireless communication;
a terminal present location detector to detect a terminal present location of the mobile terminal device;
a terminal information presenter to present information; and
a terminal controller to judge whether the in-vehicle device recognizes existence of a first object equipped with the mobile terminal device or not based on the terminal present location and the recognition information received by the terminal communicator, make the terminal information presenter present that the in-vehicle device recognizes the first object when the terminal controller judges that the in-vehicle device recognizes the existence of the first object, and make the terminal communicator transmit existence notification information to the in-vehicle device when the terminal controller judges that the in-vehicle device does not recognize the existence of the first object.

14. A recognition support method in a system including an in-vehicle device that is installed in a vehicle including a detection unit for detecting an object and a mobile terminal device that includes a terminal information presenter that presents information and performs communication with the in-vehicle device, the recognition support method comprising:
detecting a vehicle present location of the vehicle, acquiring detection information on the object from the detection unit, generating recognition information including position information on the object based on the vehicle present location and the detection information on the object, and delivering the recognition information, by the in-vehicle device; and
receiving the recognition information, detecting a terminal present location as a present location of the mobile terminal device, judging whether the in-vehicle device recognizes existence of a first object equipped with the mobile terminal device or not based on the terminal present location and the received recognition information, presenting that the in-vehicle device recognizes the first object by using the terminal information presenter when the mobile terminal device judges that the in-vehicle device recognizes the existence of the first object, and transmitting existence notification information to the in-vehicle device when the mobile terminal device judges that the in-vehicle device does not recognize the existence of the first object, by the mobile terminal device.

15. A non-transitory computer readable medium storing a recognition support program for causing an in-vehicle device, which is installed in a vehicle including a detection unit for detecting an object and performs communication with a mobile terminal device including a terminal information presenter that presents information, when executed by processing circuitry, to perform the process of:
    detecting a vehicle present location of the vehicle;
    acquiring detection information on the object from the detection unit;
    generating recognition information including position information on the object based on vehicle position information indicating the vehicle present location and the detection information on the object and delivering the recognition information from the in-vehicle device; and
    receiving existence notification information transmitted from the mobile terminal device when the mobile terminal device receiving the recognition information judges that the in-vehicle device does not recognize existence of a first object equipped with the mobile terminal device,
    wherein the recognition information is information for making the terminal information presenter present that the in-vehicle device recognizes the first object when the mobile terminal device receiving the recognition information judges that the in-vehicle device recognizes the existence of the first object.

16. A non-transitory computer readable medium storing a recognition support program for causing a mobile terminal device, which performs communication with an in-vehicle device installed in a vehicle including a detection unit for detecting an object and includes a terminal information presenter that presents information, when executed by processing circuitry, to perform the process of:
    receiving recognition information when the in-vehicle device detects a vehicle present location of the vehicle, acquires detection information on an object existing in a vicinity of the vehicle, generates the recognition information including position information on the object based on the vehicle present location and the detection information on the object, and delivers the recognition information;
    detecting a terminal present location of the mobile terminal device; and
    judging whether the in-vehicle device recognizes existence of a first object equipped with the mobile terminal device or not based on the terminal present location and the recognition information received by the mobile terminal device, making the terminal information presenter present that the in-vehicle device recognizes the first object when the in-vehicle device is judged to recognize the existence of the first object, and transmitting existence notification information from the mobile terminal device to the in-vehicle device when the in-vehicle device is judged not to recognize the existence of the first object.

* * * * *